United States Patent [19]

Crevoulin et al.

[11] Patent Number: 4,989,010
[45] Date of Patent: Jan. 29, 1991

[54] METHOD AND DEVICE FOR IDENTICAL PROCESSING OF SEVERAL SIMULTANEOUS ANALOG SIGNALS OF SHORT DURATION AND TRACKING RADAR USING THIS DEVICE

[75] Inventors: Roland Crevoulin, Paris; René Ambos, Morangis; Jean-Joel Bonnier, Ville D'Avray, all of France

[73] Assignee: Thomson CSF, Paris, France

[21] Appl. No.: 565,602

[22] Filed: Dec. 21, 1983

[30] Foreign Application Priority Data

Dec. 30, 1982 [FR] France .................................. 82 22073

[51] Int. Cl.$^5$ .................. G01S 13/44; G01S 7/40; G01S 13/28
[52] U.S. Cl. ..................................... 342/150; 342/174; 342/201
[58] Field of Search ............ 343/16 M, 17.2 PC, 17.7; 342/150, 174, 201

[56] References Cited

U.S. PATENT DOCUMENTS 3,977,000  8/1976  Wagner .......................... 343/16 M Primary Examiner—Gilberto Barron, Jr.
Attorney, Agent, or Firm—Cushman, Darby & Cushman

[57] ABSTRACT

A method and a device which make it possible, simultaneously and in a perfectly identical manner, to process n analog signals ($E_1$, $E_2$ ...) of short duration. The device comprises n processing channels ($V_1$, $V_2$, ...) each receiving an analog signal and each possessing in series, a processing circuit (11, 12; 21, 22; ...) for frequency transfer ($F_1$, $F_2$, ...), and a delay circuit $\tau_1$, $\tau_2$, ... (13, 23, ...) respectively. A set of switches ($C_1$, $C_2$, ..., $C'_1$, $C'_2$, ...) interconnect the inputs and outputs of the various elementary processing channels ($V_1$, $V_2$, ...) in order to pass each signal through all the n elementary channels ($V_1$, $V_2$, ...) successively and sequentially, for a processing cycle. This permits the fine analysis of the echo signals received from a target consisting of several bright points, by a pulse compression radar.

5 Claims, 3 Drawing Sheets

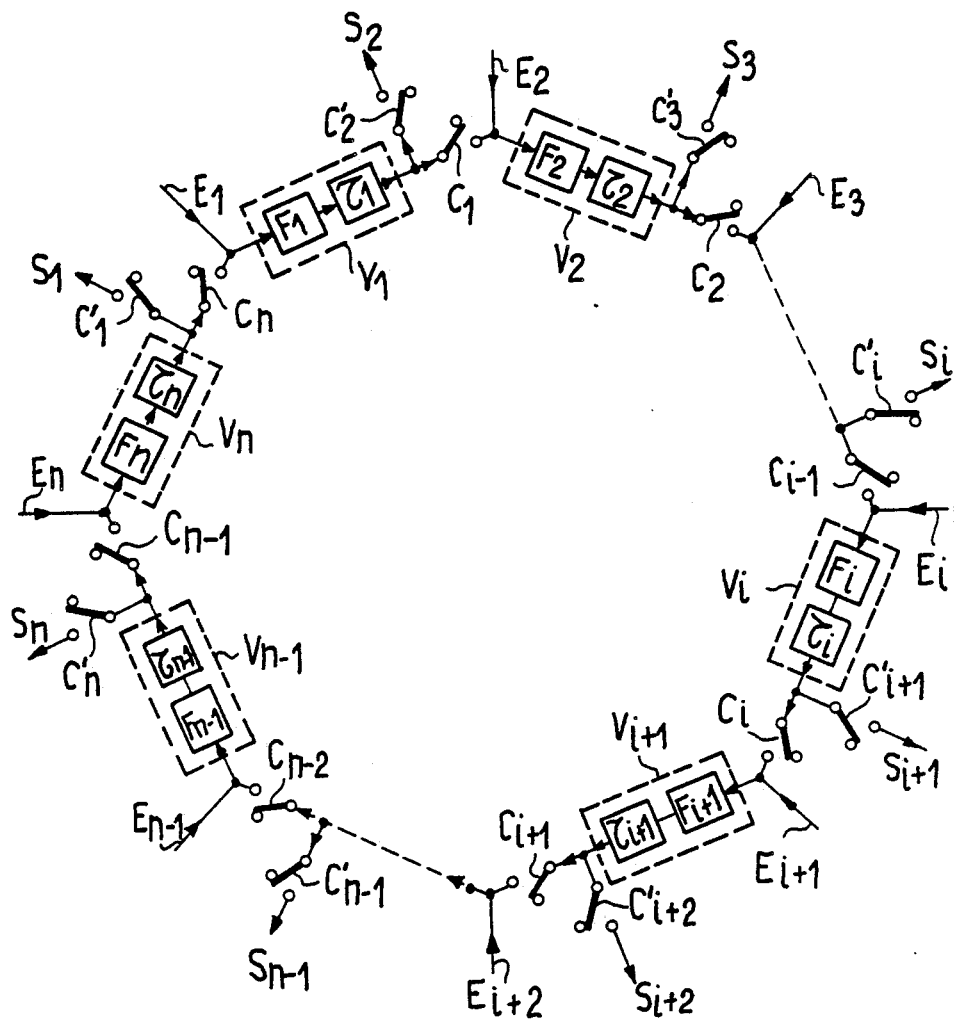
FIG_1

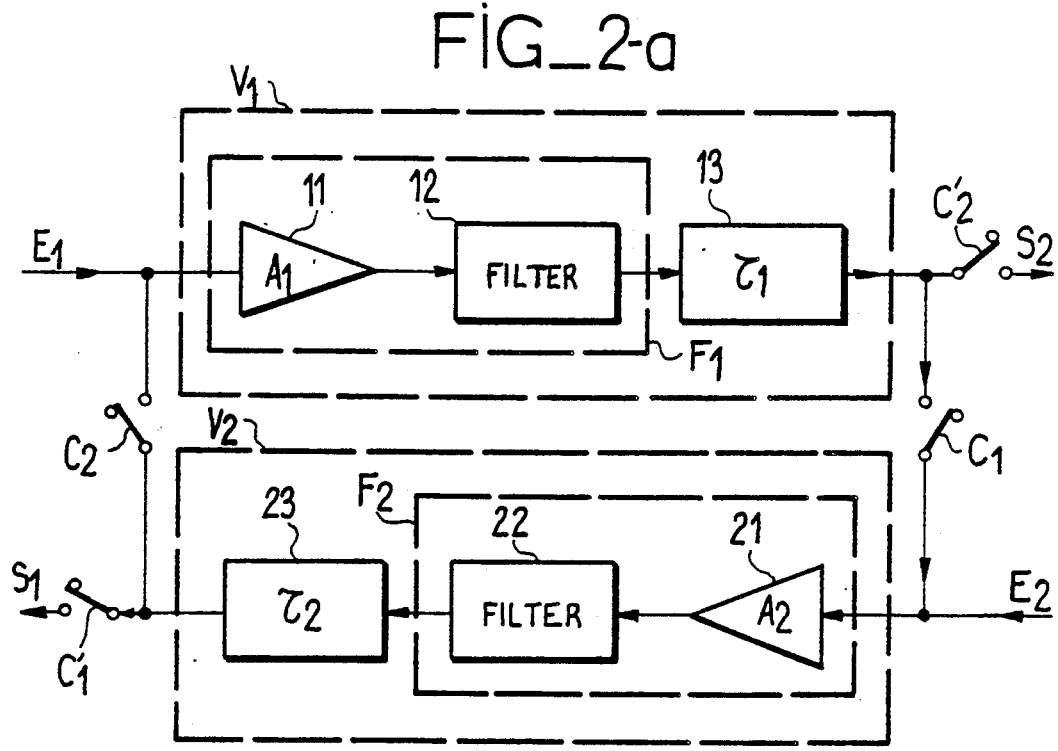
FIG_2-a
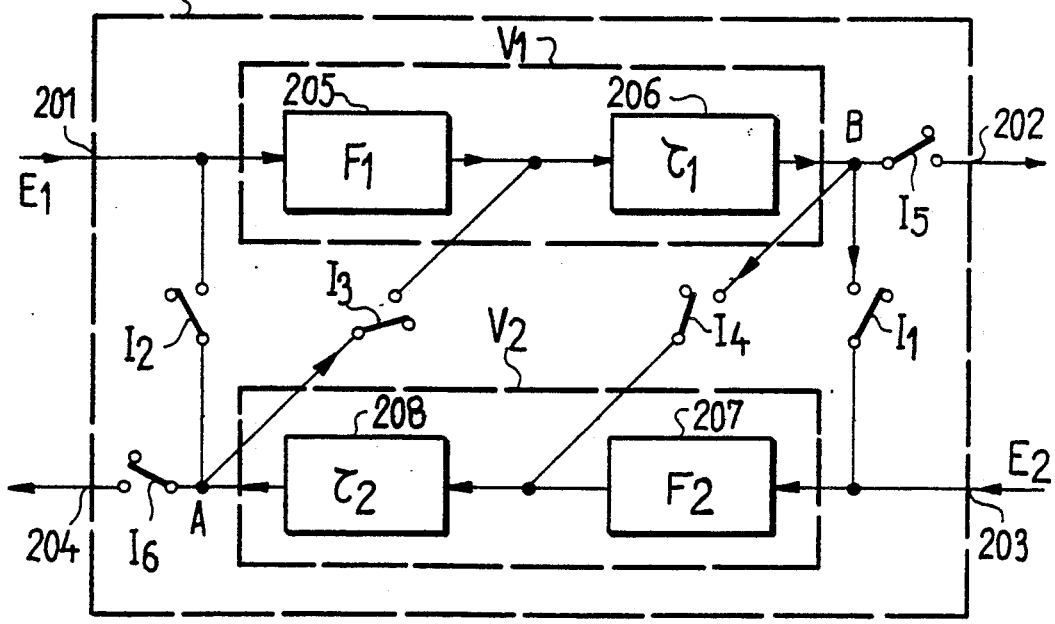
FIG_2-b

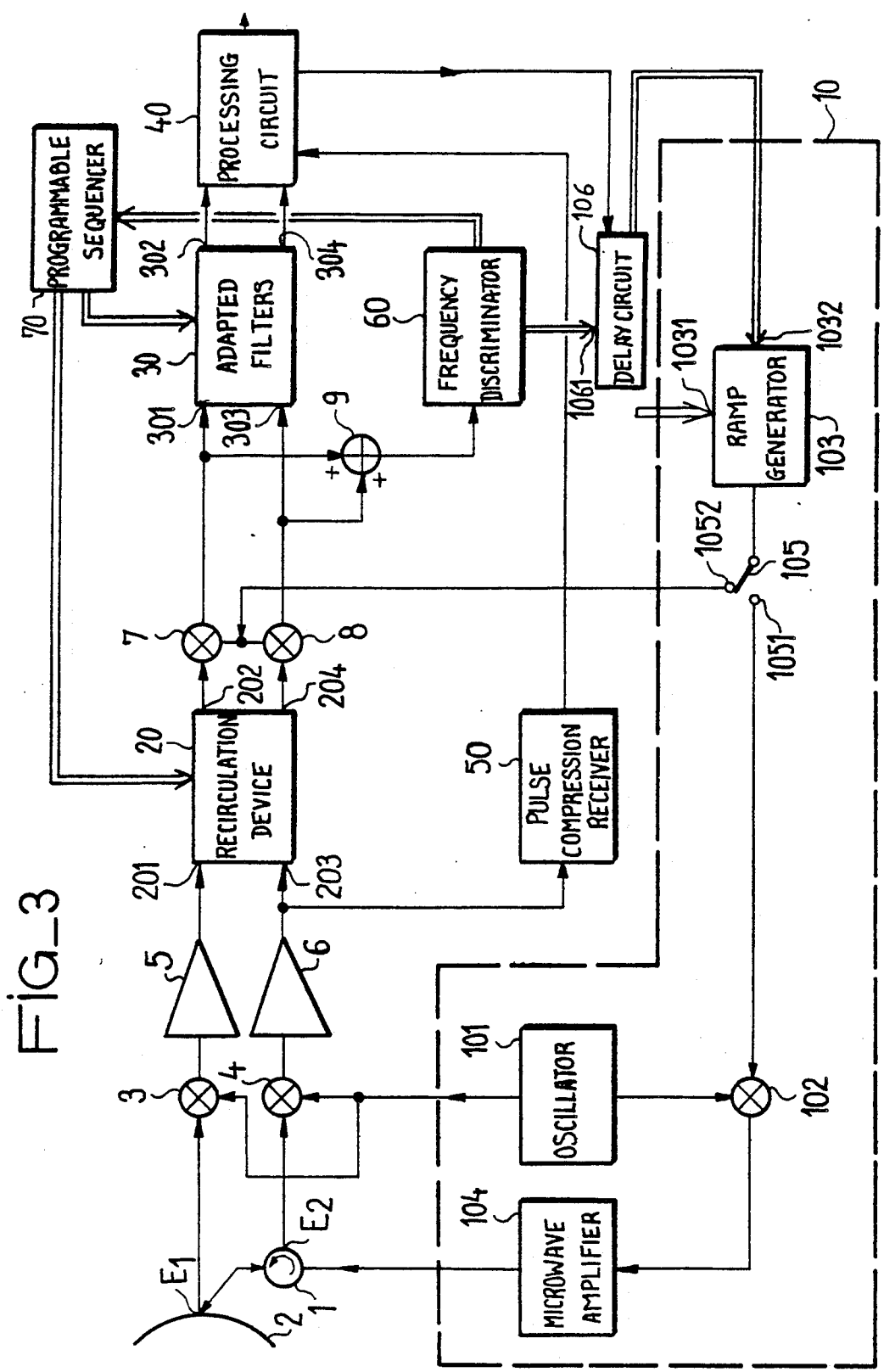
FIG_3

METHOD AND DEVICE FOR IDENTICAL PROCESSING OF SEVERAL SIMULTANEOUS ANALOG SIGNALS OF SHORT DURATION AND TRACKING RADAR USING THIS DEVICE

BACKGROUND OF THE INVENTION

The present invention relates to a method and a device for identical processing of several simultaneous analog signals of short duration. It also relates to a tracking radar using this device.

It is frequently necessary to apply a same processing operation simultaneously to several analog signals. This is the case, for example, in tracking or fire control radars, and more particularly in receivers with parallel reception channels, which require a very good identity of phase and amplitude between channels under all conditions (of input signal level, of frequency band and of operating temperature).

Hitherto, the solutions chosen for making devices with parallel channels of good identity have been of two types:

The first solution consists in making the processing channels as identical as possible by matching the electrical components or the elementary functions.

Apart from the sorting which this solution requires, and consequently the cost of the device constructed on this basis, the main disadvantage of this first solution is the instability of this identity when the components age and when the defective electronic components are replaced.

The second solution consists in using one or more calibrating devices integrated into the systems possessing such processing channels. However, the resulting identity between channels is only achieved to within 1 dB for the amplitude and to within 0.1 radian for the phase.

The present invention makes it possible to overcome the abovementioned disadvantages and relates to a so-called recirculation method to a corresponding device, which make it possible, in principle, to obtain identity between the processing channels and to considerably reduce the differential errors between channels, associated with the level of the signals to be processed.

SUMMARY OF THE INVENTION

According to the principle of the invention, for applying simultaneous and identical processing to a plurality of analog signals each signal is injected into the input of an elementary processing channel, which is different for each signal and possesses at least one delay circuit, and then passes successively and sequentially through all the elementary channels.

Another subject of the present invention is a radar possessing a recirculation device of this type and permitting the fine analysis of a target consisting of several bright points by distance discrimination.

According to the invention, the recirculation device for the simultaneous and identical processing of a plurality of n analog signals, n being a natural integer greater than 1, comprises n elementary processing channels, to the respective inputs of which the n signals to be processed are applied simultaneously, and which each possess in series a first circuit corresponding to a transfer function and a second circuit introducing a delay, and a set of switches which interconnect the inputs and outputs of the n elementary channels, and the opening or closing of which controls, for a processing cycle, the successive and sequential passage of each of the n input signals through all the n elementary processing channels.

The recirculation device according to the invention has a wide pass-band and can operate at high frequencies.

It also has an identical automatic gain control for each processing channel.

BRIEF DESCRIPTION OF THE DRAWINGS

The present invention will be understood more clearly on reading the detailed description given below with reference to the attached drawings, in which:

FIG. 1 shows the general diagram of the device according to the invention;

FIG. 2a and 2b show respectively two preferred embodiments of the device according to the invention; and FIG. 3 shows the block diagram of a radar receiver using the device in FIG. 2b.

DESCRIPTION OF PREFERRED EMBODIMENTS

The device according to the invention comprises a number of elementary processing channels equal to the number n of signals $E_1, \ldots, E_i, \ldots, E_n$. Each elementary channel $V_1, \ldots, V_i, \ldots, V_n$ includes a circuit introducing a delay $\tau_1, \ldots, \tau_i, \ldots, \tau_n$ respectively, and a circuit corresponding to a transfer function $F_1, \ldots, F_i, \ldots, F_n$ respectively.

The output of an elementary channel $V_i$ is applied to the input of the next elementary channel $V_{i+1}$ via a switch $C_i$ and also delivers a signal $S_{i+1}$ via a switch $C'_{i+1}$. The switches $C_1, \ldots, C_i, \ldots, C_n$ of the first set are closed while the switches $C'_1, \ldots, C'_i, \ldots, C'_n$ of the second set are open, and vice versa.

The device according to the invention operates as follows:

The signals $E_1, \ldots, E_i, \ldots, E_n$ are respectively applied simultaneously to the inputs of the corresponding elementary channels $V_1, \ldots, V_i, \ldots, V_n$, where they undergo a first transformation $F_1, \ldots, F_i, \ldots, F_n$ and a first delay $\tau_1, \ldots, \tau_i, \ldots, \tau_n$. A set of switches $C_1, \ldots, C_i, \ldots, C_n$ applies the output signal from each elementary channel $V_1, \ldots, V_i, \ldots, V_{n-1}$ to the input of the next elementary channel $V_2, \ldots, V_{i+1}, \ldots, V_n$, and the output signal from the last elementary channel $V_n$ to the input of the first channel $V_1$, where they undergo a second transformation $F_2, \ldots, F_{i+1}, \ldots, F_n, F_1$ and a second delay $\tau_2, \ldots, \tau_{i+1}, \ldots, \tau_n, \tau_1$ respectively. The output signal from each processing channel is then applied to the input of the next channel since the switches $C_1, \ldots, C_i, \ldots, C_n$ are closed, and so on.

The procedure is repeated until each analog signal has passed successively through the n elementary processing channels and until it has therefore undergone the same transformation by the transfer function $F_1 \times F_2 \times \ldots \times F_i \times \ldots \times F_n$ and a total delay $\tau_1 + \tau_2 + \ldots + \tau_i + \ldots + \tau_n$.

The processing applied to the input signals $E_1, \ldots, E_i, \ldots, E_n$ is therefore identical since these signals are passed sequentially through the same circuits. The analog signals can be recycled N times (N being a natural number greater than or equal to 1), through all the n elementary processing channels. The resulting transfer function is in principle the same, which eliminates all the differential errors between channels, associated with the level of the signals to be processed.

The switches $C_1, \ldots, C_i, \ldots, C_n$ are then opened. The processed signal is delivered by the device in the form of the signal $S_1, S_2, \ldots, S_i, \ldots, S_n$ at the outputs of the elementary processing channels $V_n, V_1, \ldots, V_{i-1}, \ldots, V_{n-1}$ respectively.

A second set of switches $C'_1, \ldots, C'_i, \ldots C'_n$, arranged in the path of each signal $S_1, \ldots, S_i, \ldots, S_n$ at the output of each elementary channel $V_n, V_1, \ldots, V_{1-1}, \ldots, V_{n-1}$, remains open for as long as each signal has not passed through all the elementary channels, that is to say while the switches $C_1, \ldots, C_i, \ldots, C_n$ are closed. They are then closed and the switches $C_1, \ldots, C_i, \ldots C_n$ of the first set are opened, whereupon the processed signals $S_1, \ldots, S_i, \ldots, S_n$ are delivered.

The signals for controlling the first and second sets of switches are not shown in FIG. 1.

As already mentioned above, the analog signals to be processed are simultaneous and of short duration $D_1, \ldots, D_i, \ldots, D_n$ respectively. The device described above operates provided that the shortest of the delays $\tau_1, \ldots, \tau_i, \ldots, \tau_n$ introduced into the processing channels is longer than the longest of the durations $D_1, \ldots, D_i, \ldots, D_n$ of the signals to be processed, which can be expressed by: Shortest $(\tau i) >$ Longest $(Di)$.

The association in series of several recirculation devices according to the invention, having different transfer functions and different delays, makes it possible to apply the widest variety of processing operations to the analog signals.

By recirculating the signals several times, it is also possible to carry out several different processing operations on the same signal. In the case of a signal composed of elementary signals deriving respectively from similar distance samples, it is possible to apply the same processing to each elementary signal and to analyze each elementary signal and hence each distance sample. It is one application of this principle which will be discussed in the part of the description corresponding to FIGS. 2b and 3.

FIG. 2a shows a particular embodiment of FIG. 1, in which the number n of signals to be processed is equal to two.

By way of a non-limiting example, the conversion applied to the two analog signals $E_1$ and $E_2$ in the respective elementary processing channels $V_1, V_2$ includes in succession a gain amplifier $A_1, A_2$ in a circuit 11, 21, a filter in a circuit 12, 22, which, with the corresponding amplifier 11, 21, has a transfer function $F_1, F_2$, and finally a delay $\tau_1, \tau_2$ in a circuit 13, 23 respectively. As in the general embodiment of FIG. 1, the output of the first elementary processing channel $V_1$ is connected to the input of the second elementary channel $V_2$ via the switch $C_1$. Simultaneously, the output of the channel $V_2$ is connected to the input of the first channel $V_1$ via the switch $C_2$.

The respective outputs $S_1$ and $S_2$ of the elementary channels $V_1$ and $V_2$, after passage of the signals $E_1$ and $E_2$ sequentially through the channels $V_1$ and $V_2$, are validated by the switch $C'_1$ in the case of $S_1$ and by the switch $C'_2$ in the case of $S_2$.

The gain amplifiers $A_1$ and $A_2$ are capable of providing automatic control of the total gain $A_1 \cdot A_2$ which is identical for the two input signals $E_1$ and $E_2$. According to one non-limiting example (not shown), the variable gain amplifiers 11 and 21 can be made up of one or more cells with variable gain control, associated with fixed gain amplifiers.

Without implying a limitation, the delay circuits in FIG. 1 and those bearing the reference numerals 13, 23 in FIG. 2a can preferably be delay lines operating with acoustic waves of the surface or bulk type, in particular if the delay to be introduced is longer than a few microseconds and at high frequency.

The filter 12, 22 can either be incorporated directly into the corresponding delay line 13, 23 or be made separately in the form of a discrete component or of an integrated circuit or by using any other known technology.

FIG. 2b shows another embodiment of the recirculation device according to the present invention. The device in FIG. 2b is used (sub-unit 20) in FIG. 3, which is described below.

Here again, the device 20 includes two elementary processing channels, the inputs and outputs of which are designated by the reference numerals 201 and 203, respectively 202 and 204. Each channel includes in series a circuit 205, or 207 applying a conversion, F1 or F2 respectively, to the signal applied to its input and a delay circuit 206 or 208. The conversion F1, F2 at least includes a variable gain amplification $a_1, a_2$, as in FIG. 2a. In the application in FIG. 3, the conversion is limited to an amplification. A first switch $I_1$ connects the output 202 of the first channel to the input 203 of the second channel. A second switch $I_2$ connects the output 204 of the second channel to the input 201 of the first channel. Compared with the embodiment in FIG. 2a, the device according to FIG. 2b also includes a third switch $I_3$ connecting the output A of the delay circuit 208 of the second channel to the input of the delay circuit 206 of the first channel, and a fourth switch $I_4$ connecting the output B of the delay circuit 206 of the first channel to the input of the delay circuit 208 of the second channel. Fifth and sixth switches $I_5$ and $I_6$ are arranged respectively in the output paths of the first and second processing channels, downstream of the junctions B and A respectively.

The device constructed according to FIG. 2b operates as follows: In a first step, the four switches $I_1, I_2, I_3, I_4$ are opened. The signal $E_1$, or $E_2$ respectively, applied to the input 201, or 203, of the first, or second, processing channel passes through the converting circuit 205, or 206, and then undergoes a delay $\tau_1$, or $\tau_2$, in the delay circuit 206, or 208 respectively.

In a second step, the two switches $I_1$ and $I_2$ are closed and the signals $E_1$ and $E_2$, after having been processed in the first and second processing channels respectively, then pass through the second and first channels respectively. In total, they have therefore undergone the same processing $F_1 \cdot F_2$ (at least consisting of a gain amplification $a_1 \cdot a_2$) and a delay $\tau_1 + \tau_2$, as described above.

In a third step, the switches $I_3$ and $I_4$ are closed and the switches $I_1$ and $I_2$ are opened before the signals $E_2$ and $E_1$, which have already passed through the delay circuit 206, 208 of the first and second processing channels respectively, arrive at the junction B, A. One part of the processed signal $E_2, E_1$ therefore leaves the recirculation device 20 at the output 202, first, or respectively second, processing channel, whereas the other part of the processed signal $E_2, E_1$, which may be the whole of the signal if the switches $I_5, I_6$ arranged at the outputs of the first and second processing channels respectively are open, is applied (after an amplification which is not shown) to the input of the delay circuit 208, or 206, of the second, or first, channel respectively, via the closed switch I₄, or I₃.

This part of the processed signal $E_1$, $E_2$ therefore undergoes a further delay $\tau_1$, or $\tau_2$ respectively, and then, with the switches I₅ and I₆ being opened again or having remained open as the case may be, the signals pass through the delay circuit 208, or respectively 206, where they undergo a delay $\tau_2$, or $\tau_1$.

This part of the processed signals has therefore undergone an additional delay $\tau_1 + \tau_2$ compared with the signals obtained after the second operating step.

The signals thus obtained can then be:

entirely recycled into the loop formed by the delay circuits 206 and 208 and the closed switches I₃ and I₄, if the switches I₁, I₂, I₅, I₆ are open, in which case the signals undergo, in each cycle, a total additional delay $\tau_1 + \tau_2$ each time they pass around the loop;

or entirely delivered at the output 202, 204 of the device, if the switches I₅ and I₆ are closed and the switches I₁, I₂, I₃, I₄ are open:

or, if the switches I₃, I₄, I₅ and I₆ are closed and the switches I₁ and I₂ are open, partially delivered at the output 202, 204 respectively of the device, the other part being recycled into the loop 206, 208, I₃, I₄, as described in the first case.

The gain of the amplifier included in the processing circuit 205, 207 can be controlled by means of an AGC loop (not shown). This produces a recirculation device with an analog memory loop.

FIG. 3 shows a pulse compression radar using the recirculation device according to the invention shown in FIG. 2b.

It is assumed that the target detected is composed of a plurality of bright points.

The transmission unit 10 includes a microwave oscillator 101 which feeds the first input of a first mixer 102, and a frequency ramp generator 103 which is actuated by a signal applied to its control input 1031 and to the second control input 1032 of which a pulse can be applied at a given instant by a circuit 106, itself controlled by the signals processed in the reception unit. The signal applied to the first control input 1031 initiates the transmission ramp and is provided by a general sequencing circuit (not shown) of the radar. The generator 103 feeds the second input of the mixer 102 via a two-way switch 105 when the latter is in position 1051. According to a non-limiting embodiment, the pulse compression is effected on transmission by the frequency ramp generator 103 connected to the input of the mixer 102, the output signal of which is amplified in a microwave device 104.

The signal dispersed reaches the transmission-reception antenna 2 via a circulator 1.

In the conventional manner, the antenna 2 delivers, on reception a first signal $E_1$ and a second signal $E_2$ from the signal returned by a target and received by the antenna 2.

The first signal $E_1$ directly feeds the first input of a second mixer 3. The second signal $E_2$ is applied to the first input of a third mixer 4 via the circulator 1.

The second input of the second and third mixers 3 and 4 respectively receives the microwave signal delivered by the oscillator 101 of the transmission unit 10.

The output of each mixer 3, 4 is applied to the input of an amplifier 5, 6 respectively.

The reception unit is composed of five sub-units 20, 30, 40, 50, 60.

The signal obtained at the output of the amplifier 6 feeds the sub-unit 50 consisting of a range measurement receiver with pulse compression. A receiver of this type is known to those skilled in the art and does not form a subject of the invention. Consequently, it will not be described in detail. It delivers a series of fine pulses which are applied to an input of the sub-unit 40.

The first sub-unit 20 of the reception unit consists of a recirculation device according to the invention, the preferred embodiment of which is shown in FIG. 2b. It has first and second elementary processing channels. The first channel has an input 201 and an output 202. The second channel has an input 203 and an output 204.

The output signal from the amplifier 5, or 6 is applied to the input 201 of the first elementary processing channel, or respectively to the input 203 of the second elementary processing channel.

The output 202, or 204 respectively, of the first sub-unit 20 is applied to the first input of a mixer 7, or 8 respectively, the second input of which receives the frequency ramp produced by the generator 103 when the switch 105 is in position 1052.

The second sub-unit 30 of the reception part consists of circuit which filters the two signals applied to its inputs 301 and 303, namely the output signals from the fourth and fifth mixers respectively, in a manner adapted to the pulse compression. According to a preferred and non-limiting embodiment the second sub-unit 30 consists of a second recirculation device with two elementary processing channels, the respective inputs and outputs of which are designated by reference numerals 301 and 302 for the first channel and 303 and 304 for the second channel. The two inputs 301 and 303 are respectively fed with the output signal from the fourth and fifth mixers 7 and 8. This second recirculation device 30 according to the invention is not shown in detail in FIG. 3. The two elementary channels each possess a filter and a delay circuit. The two sub-units 20 and 30 are controlled by a programmable sequencer 70.

The output signals delivered by the first and second elementary processing channels at 302 and 304 feed the circuit 40 for processing the radar data, which constitutes the third sub-unit of the reception part.

One part of the output signals from the fourth and fifth mixers 7 and 8 is removed and applied respectively to the first and second inputs of an adding circuit 9, the output of which feeds a frequency discriminating circuit 60 consisting, for example, of a bank of N filters with a narrow band $\Delta F$ equal to $1/T$, where T is the duration of the demodulated pulse received in the mixers 7 and 8 respectively. The signal present at the output of the filter of order p is applied to the control input 1061 of the variable delay control circuit 106. The filtering circuit 60 orders the sequencer 70 to stop when the various bright points have been analyzed.

The pulse compression radar according to FIG. 3, in which the sub-unit 20 is a recirculation device according to FIG. 2b, operates as follows:

The signal transmitted by the antenna 2 is a linearly frequency-modulated microwave signal generated by the circuit 103 when the switch 105 is in position 1051.

The signal returned by the target and received by the antenna 2 is broken down by circuits attached to the antenna 2 (circuits not shown) into two signals $E_1$ and $E_2$ representing the "sum" and "difference" channels of the antenna. The signal $E_1$ and, via the circulator 1, the signal $E_2$ are transposed to intermediate frequency by the second and third mixers 3 and 4 respectively, fed by the transmission microwave oscillator 101.

The signals are amplified and then, in the first sub-unit 20, undergo the same gain amplification a1, a2, controlled by an AGC loop (not shown in FIG. 2b), and the same delay $\tau_1 + \tau_2$ when the switches $I_3, I_4, I_5, I_6$ are open and $I_1, I_2$ are closed. The switches change over: $I_1$ and $I_2$ open and $I_3, I_4, I_5, I_6$ close. One part of the signals, "recirculated" once, is then applied to the input of the fourth and fifth mixers 7 and 8 respectively, which also receive a replica of the frequency ramp delivered to the transmission unit by the generator 103, the switch 105 having taken up position 1052, the frequency ramp being delayed by a length of time defined in the processing sub-unit 40, as described below. The other part of the signals $E_1$ and $E_2$ "recirculated" once, is recycled into the analog memory loop of the recirculation device 20 (FIG. 2b), formed by the delay circuits 206, 208 and the closed switches $I_3, I_4$, the switches $I_5$ and $I_6$ opening during the passage of the signals $E_1$ and $E_2$ into the loop and closing again each time they have passed around the loop, in order to deliver part of the signals to the mixers 7 and 8, delayed by an additional amount $\tau_1 + \tau_2$ each time they pass around the loop.

Simultaneously, the intermediate frequency signal $E_2$ obtained at the output of the third mixer 4, and then amplified, is compressed in the range measurement receiver with pulse compression, 50. The receiver 50 delivers fine pulses which correspond to the bright points of the target detected, and which are applied to the input of the processing sub-unit 40. The sub-unit 40 delivers a pulse which, via the variable delay circuit 106, controls the generation, by the ramp generator 103, of the delayed replica of the frequency ramp for demodulation of the signals received.

The signals $E_1$ and $E_2$ recycled into the analog memory loop of the recirculation device 20 (FIG. 2b) are successively demodulated in the mixers 7 and 8, which also receive a replica of the frequency ramp delivered to the transmission unit by the generator 103, delayed by the amount $\tau_1 + \tau_2 + \Delta\tau$.

This delay is generated in the variable delay circuit 106. The quantity $\Delta\tau$ is a function of the radar range discrimination sought, or range sample.

Therefore, for each range sample analyzed successively, there is a demodulation of the signals received $E_1$ and $E_2$ in the mixers 7 and 8. The demodulated signals are then summed by the adding circuit 9, the output signal of which is applied to the input of the frequency discriminating circuit 60. The discriminator 60 delivers a voltage proportional to the frequency difference, this voltage then being sent to the input of the variable delay circuit 106, which produces a pulse delayed by $\tau_1 + \tau_2 + \Delta\tau$. This delayed pulse is applied to the input of the ramp generator 103, which generates a replica of the frequency ramp for the demodulation of the signals received $E_1$ and $E_2$. The signals for controlling the circuits 20 and 30 are delivered by the programmable sequencer 70, which makes it possible to analyze each range sample successively and stops when it receives an end-of-sequence pulse generated by the discriminating circuit 60. A first measurement on a test pulse makes it possible to measure the delay $\tau_1 + \tau_2$ so as to allow for the possible variations in this delay due to temperature and ageing.

In all the foregoing discussion, it has been assumed, as mentioned earlier, that the duration of the input signals is shorter than the delays $\tau_1$ and $\tau_2$ in each of the elementary processing channels of the recirculation devices.

Thus, a device has been described which can be used in radar and makes it possible to analyze targets by fine range discrimination with pulse compression.

What is claimed is:

1. A range tracking radar comprising:
    a transmission-reception antenna for receiving echo signals from bright points constituting the target and transmitting a linearly frequency-modulated microwave signal;
    a recirculation device having (a) two elementary processing channels with respective inputs to which two signals to be processed are applied simultaneously and respective outputs, each said channel including an automatic gain control amplifier and a delay circuit connected serially to said amplifier, (b) two switches each connecting the output of the delay circuit of one channel to the input of the delay circuit of the other channel to form an analog memory loop for a duration which is a multiple of the sum of the delays and (c) two switches connecting the inputs and outputs of said channels for controlling a processing cycle in which echo signals pass successively and sequentially through said two channels;
    means for generating a delayed replica of a transmission frequency ramp;
    means for controlling delay of the replica of the frequency ramp relative to the transmission frequency ramp;
    means utilizing the delayed replica to demodulate the signals at the outputs of the recirculation device for each cycle of the analog memory loop and produce demodulated signals;
    filtering means for frequency filtering the demodulated signals to produce output signals;
    means for processing the echo signals in accordance with the output signals of the filtering means; and
    means for controlling the processing means.

2. A radar as in claim 1 wherein said means for controlling the processing means includes a range tracking receiver with pulse compression delivering a series of fine pulses corresponding to the distance bands analyzed.

3. A radar as in claim 1 wherein said delay controlling means includes means for discriminating the frequency of the demodulated signals and delay means connected in series with said discriminating means for determining from the output of the disciminating means the delay to be applied to the replica of the frequency ramp relative to the transmission frequency ramp.

4. A radar as in claim 3 wherein said discriminating means includes a bank of narrow band filters.

5. A radar as in claim 1 further including a programmable sequencer controlling the recirculation device and the filtering means.

* * * * *